United States Patent
Gamage et al.

(10) Patent No.: US 10,240,078 B2
(45) Date of Patent: *Mar. 26, 2019

(54) VOLATILE SURFACTANT TREATMENT FOR USE IN SUBTERRANEAN FORMATION OPERATIONS

(71) Applicant: Halliburton Energy Services, Inc., Houston, TX (US)

(72) Inventors: Pubudu H. Gamage, Katy, TX (US); Cato Russell McDaniel, Montgomery, TX (US)

(73) Assignee: Halliburton Energy Services, Inc., Houston, TX (US)

(*) Notice: Subject to any disclaimer, the term of this patent is extended or adjusted under 35 U.S.C. 154(b) by 112 days.

This patent is subject to a terminal disclaimer.

(21) Appl. No.: 14/906,316

(22) PCT Filed: Feb. 18, 2014

(86) PCT No.: PCT/US2014/016837
§ 371 (c)(1),
(2) Date: Jan. 20, 2016

(87) PCT Pub. No.: WO2015/060891
PCT Pub. Date: Apr. 30, 2015

(65) Prior Publication Data
US 2016/0160115 A1    Jun. 9, 2016

Related U.S. Application Data

(63) Continuation-in-part of application No. PCT/US2013/066398, filed on Oct. 23, 2013.

(51) Int. Cl.
*E21B 43/16* (2006.01)
*E21B 43/22* (2006.01)
(Continued)

(52) U.S. Cl.
CPC .............. *C09K 8/594* (2013.01); *C09K 8/584* (2013.01); *E21B 43/166* (2013.01)

(58) Field of Classification Search
CPC ......... C09K 8/584; C09K 8/594; E21B 43/16; E21B 43/166
See application file for complete search history.

(56) References Cited

U.S. PATENT DOCUMENTS 3,817,331 A    6/1974  Jones
4,353,806 A   10/1982  Canter et al.
(Continued)

FOREIGN PATENT DOCUMENTS

WO         9603474 A1    2/1996
WO      2015060842 A1    4/2015
WO      2015060891 A1    4/2015

OTHER PUBLICATIONS

Mobeenfatemi et al., "Experimental and Numerical Investigation of the Impact of Design Parameters on the Performance of WAG and SWAG Injection in Water-Wet and Mixed-Wet Systems," SPE 165286, 2013.
(Continued)

*Primary Examiner* — Zakiya W Bates
(74) *Attorney, Agent, or Firm* — Tenley Krueger; C. Tumey Law Group PLLC

(57) ABSTRACT

Methods including providing a treatment fluid comprising: a gas; and a volatile surfactant dispersed in the gas, wherein the volatile surfactant has a normal boiling point of less than 260° C. without substantial thermal decomposition and a dynamic surface tension of less than about 40 dynes/cm for a 0.1% solution; and intermittently introducing the treatment fluid and an aqueous fluid into a treatment zone in a subterranean formation.

41 Claims, 1 Drawing Sheet

(51) Int. Cl.
*C09K 8/594* (2006.01)
*C09K 8/584* (2006.01)

(56) References Cited

U.S. PATENT DOCUMENTS

| | | |
|---|---|---|
| 4,828,029 A | 5/1989 | Irani |
| 5,033,547 A | 7/1991 | Schievelbein |
| 5,310,002 A | 5/1994 | Blauch et al. |
| 5,363,915 A | 11/1994 | Marquis et al. |
| 6,123,159 A | 9/2000 | Brookey et al. |
| 6,794,550 B2 | 9/2004 | Hintzer et al. |
| 7,547,797 B2 | 6/2009 | Yamamoto et al. |
| 7,771,588 B2 | 8/2010 | Engel et al. |
| 8,408,313 B2 | 4/2013 | Yale et al. |
| 9,234,407 B2 | 1/2016 | Meyer |
| 2003/0083206 A1 | 5/2003 | Masikewich et al. |
| 2003/0127226 A1 | 7/2003 | Heins |
| 2005/0239957 A1 | 10/2005 | Pillsbury et al. |
| 2007/0111903 A1 | 5/2007 | Engel et al. |
| 2009/0200033 A1 | 8/2009 | Kakadjian et al. |
| 2009/0253595 A1 | 10/2009 | Qu et al. |
| 2012/0103635 A1 | 5/2012 | Sanders et al. |
| 2012/0150519 A1 | 6/2012 | Bang et al. |
| 2013/0068312 A1 | 3/2013 | Sanders |
| 2013/0267570 A1 | 10/2013 | Premachandran et al. |
| 2014/0251607 A1 | 9/2014 | Sanders et al. |
| 2015/0361323 A1 | 12/2015 | Gamage et al. |
| 2016/0069159 A1 | 3/2016 | Teklu et al. |
| 2016/0200961 A1 | 7/2016 | McDaniel et al. |

OTHER PUBLICATIONS

Surfynol® Surfactant Data Sheet, Air Products, 1999.
Surfynol® 82 Surfactant Data Sheet, Air Products, not dated.
Surfynol® Surfactant Data Sheet, Defoamer Nonionic Dynamic Wetting Agent and Molecular Defoamer, Air Products, 2013.
Surfynol® 104 Surfactant Data Sheet, Air Products, 2001.
Menger et al., "Gemini Surfactants with Acetylenic Spacers," Langmuir 2000, 16, 2062-2067, 1999.
Stoilov, "Fluorocarbons as Volatile Surfactants", Langmuir 1998, 14, 5685-5690.
International Search Report and Written Opinion for PCT/US2014/016837 dated Jul. 18, 2014.
Mobeen Fatemi et al., Experimental and Numerical Investigation of the Impact of Design Parameters on the Performance of WAG and SWAG Injection in Water-Wet and Mixed-Wet Systems, SPE 161827, 2013.
Patent Examination Report No. 1 received in corresponding Australian Application No. 2014337582, dated Aug. 5, 2016.
1-Hexyn-3o1,3,5-dimethyl-(cas 107-54-0) MSDSm retrieved Jun. 5, 2017 from http://www.guidechem.com/msds/107-54-0.html.
Davies, J.T., A Quantitative Kinetic Theory of Emulsion Type I. Physical Chemistry of the Emulsifying Agent, Gas/Liquid and Liquid/Liquid Interface, Proceedings of the International Congress of Surface Activity (1957): 426-438.
Griffin W.C.: Calculation of HLB Values of Non-Ionic Surfactants, Journal of the Society of Cosmetic Chemists 5 (1954): 249.
Griffin W.C.: Classification of Surface-Active Agent by HLB, Journal of the Society of Cosmetic Chemists 1 (1949): 311.
Hoffman, B. Todd, Comparison of Various Gases for Enhanced Recovery from Sale Oil Reservoirs, SPE 154329, 2012.
Luffel et al., Matrix Permeability Measurement of Gas Productive Shales; D.L. Luffel, ResTech Houston,; C.W. Hopkins, S.A., Holdtich & Asssocs. Inc.; and P.D. Schettler Jr., Juniata College; SPE 26633, 1993.

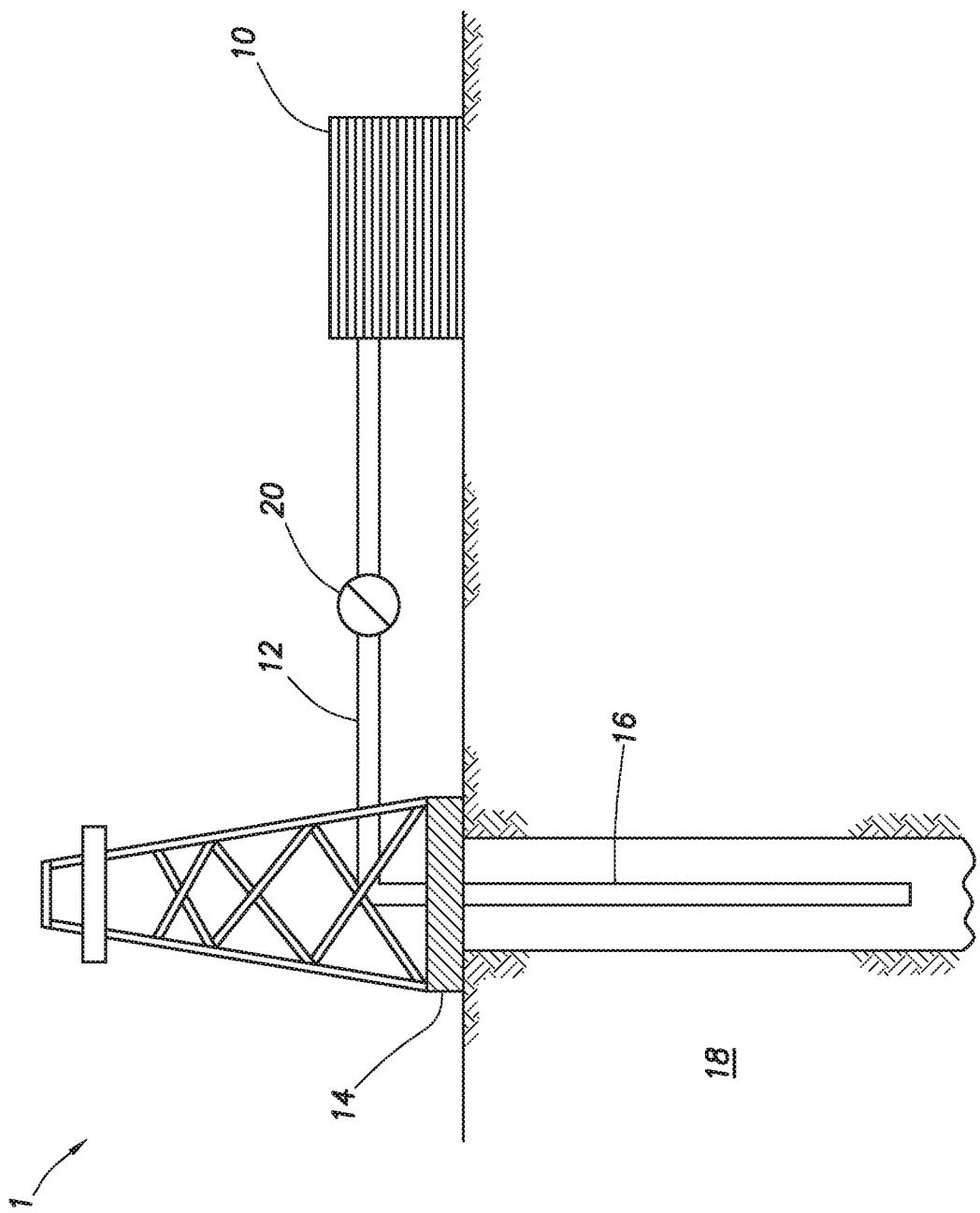

VOLATILE SURFACTANT TREATMENT FOR USE IN SUBTERRANEAN FORMATION OPERATIONS

CROSS-REFERENCE TO RELATED APPLICATIONS

This application is a continuation-in-part of PCT/US13/66398, entitled "Volatile Surfactant Treatment for Subterranean Formations," filed on Oct. 23, 2013, which is hereby incorporated by reference in its entirety.

BACKGROUND

The embodiments herein relate to the use of volatile surfactants to increase the recovery of gas or oil from subterranean formation, including during enhanced oil recovery operations.

Subterranean wells (e.g., hydrocarbon producing wells, gas producing wells, and the like) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein simply as a "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") serve to prevent the fractures from fully closing once the hydraulic pressure is removed. By keeping the fractures from fully closing, the proppant particulates aid in forming conductive paths through which fluids produced from the formation flow, referred to as a "proppant pack." The degree of success of a stimulation operation depends, at least in part, upon the porosity of the proppant pack to permit the flow of fluids through the interconnected interstitial spaces between abutting proppant particulates.

In some cases, subterranean treatment operations (e.g., hydraulic fracturing, and the like) may be supplemented with enhanced oil recovery (EOR) techniques. EOR techniques are used increase recovery of production fluids (e.g., hydrocarbons) by restoring formation pressure and improving fluid flow in the formation and typically involve injection of a substance that is not naturally occurring in a hydrocarbon-bearing formation. One EOR technique involves introducing a flooding composition into the subterranean formation in order to pressurize the formation and drive hydrocarbons toward one or more production wells. Such flooding compositions may be a gas (in gas injection operations) or a combination of a gas and water. When the flooding composition is a combination of gas and water, the flooding composition may be injected into the formation by alternating the injection of the gas and the water (referred to as a water alternating gas ("WAG") technique) or by simultaneously injecting the gas and the water (referred to as a simultaneous water and gas injection ("SWAG") technique).

WAG and SWAG techniques may increase hydrocarbon recovery as compared to standard gas injection by an additional 5-20% because the gas and water operate synergistically to enhance oil recovery. The gas is absorbed by the hydrocarbons in the formation, thereby reducing the viscosity of the hydrocarbons and improving their ability to flow through the formation. The pressure of the water injection aids in driving the hydrocarbons having the gas dissolved therein toward a production well. WAG and SWAG techniques also increase sweep efficiency and the amount of gas needed for a particular EOR operation.

To further increase the sweep efficiency of a flooding composition, a surfactant may be included in the composition. The surfactant may reduce the interfacial tension between oil and water, thus decreasing capillary pressure. The surfactant may also alter rock wettability, making the formation water-wet or mixed-wet. Such interfacial tension reduction and/or altering of rock wettability may increase the recovery of hydrocarbons from the formation. Common EOR surfactants are non-volatile. Traditional surfactants for use in EOR operations have included dodecylbenzene sulfonic acid and its salts (having a lowest value boiling point of 290° C. (554° F.)), ethoxylates including ethylene oxide/propylene oxide block copolymers (having such high molecular weights that they decompose rather than have a normal boiling point on heating), and sulfonates. None of these traditional surfactants exhibit significant (and in some cases no) volatility under common downhole conditions.

BRIEF DESCRIPTION OF THE DRAWINGS

The following FIGURES are included to illustrate certain aspects of the embodiments described in the present disclosure, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to the use of volatile surfactants to increase the recovery of gas or oil from subterranean formation, including during enhanced oil recovery operations. Specifically, the embodiments herein relate to enhanced oil recovery operations including traditional gas injection, WAG injection, and SWAG injection.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

I. Definitions and Usages

The words or terms used herein have their plain, ordinary meaning according to one of skill in the art, except to the extent explicitly and clearly defined in this disclosure or unless the specific context requires a different meaning. If there is any conflict in the usages of a word or term in the present disclosure and one or more patent(s) or other document(s) that may be incorporated in their entirety by reference, the definitions that are consistent with this specification should be adopted.

The words "comprising," "containing," "including," "having," and all grammatical variations thereof are intended to have an open, non-limiting meaning. For example, a composition "comprising" a component does not exclude it from having additional components, and a method "having" a step does not exclude it from having additional steps. When such terms are used, the compositions and methods that "consist essentially of" or "consist of" a specified component or step are specifically included and disclosed. Additionally, while compositions and methods are described herein in terms of "comprising" various components or steps, the compositions and methods can also "consist essentially of" or "consist of" the various components and steps. As used herein, the term "consisting essentially of," and all grammatical variations thereof are intended to limit the scope of a claim to the specified materials or steps and those that do not materially affect the basic and novel characteristic(s) of a claim disclosed herein.

As described in some embodiments herein, the term "hydrocarbons" is understood to refer to oil and gas (e.g., crude oil and natural gas, respectively) naturally occurring in a subterranean formation. The term "subterranean formation," as used herein refers to a body of rock that has sufficiently distinctive characteristics and is sufficiently continuous for geologists to describe, map, and name it. A subterranean formation having sufficient porosity and permeability to store and transmit hydrocarbons may be referred to herein as a "reservoir." A reservoir may be located in a subterranean formation under land or under the seabed offshore. In some instances, reservoirs in subterranean formations comprising hydrocarbons may be located in the range of from about a few hundred feet ("shallow" reservoirs) to from about a few tens of thousands of feet ("ultra-deep" reservoirs) below the surface of the land or seabed.

In a conventional reservoir, the hydrocarbons may flow to a wellbore drilled within the subterranean formation in a manner that may be characterized by flow through permeable media, where the permeability may or may not have been altered near the wellbore, or flow through permeable media to a permeable (conductive), fracture formed in the formation (e.g., by hydraulic fracturing). A conventional reservoir may have a permeability greater than about 1 milliDarcy ("mD") (equivalent to about 1,000 microDarcy).

A conventional reservoir may be shaped such that it will trap hydrocarbons and may be covered by a relatively impermeable rock, known as a cap rock. The cap rock forms a barrier above the reservoir so that fluids cannot migrate beyond the reservoir. A cap rock capable of being a barrier to fluid migration on a geological time scale may have a permeability that is less than about 1 microDarcy. Cap rock is commonly salt, anhydrite, or shale. In addition, the hydrocarbons located in the reservoir are located vertically based on their density, where the movement of one type of reservoir fluid can apply a driving force to another reservoir fluid. As used herein, the term "fluid" refers to liquid phase fluids and gas phase fluids. Most conventional reservoir rocks are limestone, dolomite, sandstone, and combinations thereof.

Non-conventional reservoirs may also house hydrocarbons for production. In a non-conventional reservoir, the permeability may be less than 1 mD. Typical non-conventional reservoirs include tight gas and shale formations. Tight gas is a natural gas that is difficult to access because the permeability is relatively low. Generally, tight gas is in a subterranean formation having a permeability in the range of an upper limit of about 1 mD to a lower limit of about 0.01 mD. Typically, to produce tight gas, it is necessary to find a "sweet spot" where a large about of gas is accessible, and sometimes to use various means to create a reduced pressure in the wellbore to help draw the gas from the formation.

Shale, which is typically considered a cap rock, may also include relatively large amounts of hydrocarbons. Shale is a sedimentary rock derived from mud. Shale rock is commonly finely laminated (bedded) and particles in shale are commonly clay materials mixed with tiny grains of quartz eroded from preexisting rocks. Hydrocarbons may be very difficult to produce from shale, however, due to the low permeability of the formation, typically less than about 0.01 mD (10 microDarcy). As used herein, an ultra-low permeable formation has a permeability of less than about 0.001 mD. Ultra-low permeable formations tend to have a naturally occurring network of multiple interconnected micro-sized fractures (which may also be referred to herein as "microfractures"). The fracture complexity is sometimes referred to in the art as a fracture network. Ultra-low permeable formations may be additionally fractured to create or enhance one or more of such interconnected micro-sized fractures (or fracture networks). The approach may be used to help produce or increase production of hydrocarbons from ultra-low permeable formations.

To produce hydrocarbons (e.g., oil and/or gas) from a reservoir, a wellbore is drilled into a subterranean formation, which may comprise the reservoir or which may be adjacent to the reservoir. Typically, the wellbore is drilled hundreds or thousands of feet into the subterranean formation to reach (or be adjacent to) a hydrocarbon-bearing reservoir. Additional well services (other than drilling) designed to facilitate or enhance production of desirable fluids from or through a subterranean formation may include introducing fluids into the wellbore, cementing operations, completion operations, intervention operations, and the like.

As used herein, the term "well" includes a wellhead and at least one wellbore penetrating a subterranean formation from the wellhead. The term "wellhead," as used herein, refers to the surface termination of a wellbore, which surface may be on land or on a seabed. The geographical location of a wellhead at the surface may be referred to herein as a "well site," which may include related facilities, such as a tank battery, separators, compressor stations, heating, or other equipment, fluid pits, and the like. Offshore well sites may further include a floating platform.

As used herein, the term "wellbore" refers to a drilled hole, including any cased or uncased portions of the wellbore or any other tubulars therein. The term "borehole" may be used to refer to the inside wall of the wellbore (i.e., the rock surface or wall that bounds the drilled hole). A wellbore may have one or more portions that are vertical, horizontal, or any orientation therebetween (e.g., a deviated wellbore), and may further have portions that are straight, curved, branched, or any other suitable wellbore shape. A wellbore may be used as a production wellbore or an injection wellbore, the production wellbore being used to produce hydrocarbons from a reservoir and the injection wellbore being used to inject fluid (e.g., water, steam, or other liquids or gases) into a subterranean formation to drive hydrocarbons to a production well.

As used herein, the term "into a well," and all of its variants, refers to introducing a fluid, component, or other item at least into and through the wellhead. According to various techniques known in the art, such fluids, components, or items may include pad fluids, fracturing fluids, acidizing fluids, tubulars, equipment, tools, and the like that may be directed into a desired portion of the wellbore through the wellhead. As used herein, the term "tubular" refers to any kind of structural body in the general form of a tube. Tubulars may be made of any suitable material capable of use in a subterranean formation and often are made of steel. Specific examples of tubulars for use in a wellbore may include, but are not limited to, drill pipe, casing, tubular strings, production tubing, liner pipe, transportation pipe, coiled tubing, and the like.

As used herein, the term "treatment" refers to any treatment for changing a condition of one or more portions of a wellbore or a subterranean formation adjacent to a wellbore; however, the term does not necessarily imply any particular treatment purpose. A treatment typically involves introducing a fluids into the wellbore, which may be referred to as a "treatment fluid."

As used herein, the terms "uphole," "downhole," and similar directional terms refers to the direction of the wellhead, regardless of whether the wellbore is vertical or horizontal, the term "uphole" referring to the direction toward the wellhead and the term "downhole" referring to the direction away from the wellhead. In the context of a wellbore, the term "portion" or "interval" refers to any downhole portion of the wellbore beyond the wellhead and along the entire length of the wellbore. The term "zone," as used herein, refers to a portion or interval of rock along a wellbore that is differentiated from uphole and downhole intervals based on hydrocarbon content or other features, such as permeability, composition, perforations, or other fluid communication with the wellbore, faults, or fractures. A zone of a wellbore that penetrates a hydrocarbon-bearing portion of the wellbore and is capable of producing hydrocarbons may be referred to as a "production zone." A "treatment zone," as used herein, refers to a zone into which a fluid is directed to flow from the wellbore. As used herein, "into a treatment zone" means into and through the wellhead and, additionally, into and through the wellbore wall and into the treatment zone. A treatment zone may be a production zone.

As used herein, the term "design," generally refers to the estimate or measure of one or more parameters planned or expected for a particular fluid or stage of a well service or treatment. For example, a fluid may be designed to have constituents that provide a minimum density or viscosity for at least a specified period of time under expected downhole conditions. A well service may include design parameters such as fluid volume to be pumped, required pumping time for a fluid, the pressure to be achieved in the wellbore while pumping the fluid, the shear conditions of the pumping, and the like. The temperature of the downhole environment at a portion of the wellbore during the time of a treatment may be estimated or otherwise actually measured, such temperature is referred to herein as "design temperature." The design temperature, for example, may take into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures may be quite large. Ultimately, if left undisturbed a subterranean formation will return to the BHST. In general, the greater the depth of the formation, the greater the BHST, as well as the greater the pressure. The design of a particular treatment may be modeled, for example, by IMEX® Three-Phase, Black-Oil Reservoir Simulator software, available from Computer Modeling Group Ltd. in Houston, Tex., or a similar reservoir simulator.

The term "damage," as used herein, refers to undesirable particulates in a subterranean formation that may reduce the formations permeability. Among other things, scale, gel residue, hydrates, formation fines, clay, organic deposits (e.g., paraffins or asphaltenes), inorganic deposits, bacterial activity, particles from injected fluid, certain wettability alterations, emulsions, and acid reactions, combinations thereof, and the like, are contemplated by this term.

Several production stages may be used in the process of extracting hydrocarbons from a reservoir in a subterranean formation. "Primary production" (which may also be referred to as "primary recovery") is the first stage of hydrocarbon production, in which natural reservoir energy, such as gasdrive, waterdrive, or gravity drainage is used to displace hydrocarbons from a reservoir and into a wellbore for production to the surface. It is often additionally necessary to implement an artificial lift system from the wellbore adjacent to the production zone to the wellhead, such as a rod pump, an electrical submersible pump, a gas-life installation, and the like. Production to the wellhead by natural reservoir energy or using artificial life is considered primary production. The primary production stage is considered ended either when the reservoir pressure is so low that the production rates are not economical, or when the proportions of undesirable gas or water in the production stream are too high. During primary production, only a small percentage of the initial hydrocarbons in place in the reservoir are produced, typically around 10% for oil reservoirs.

The next stage of production is termed "secondary production" (which may also be referred to as "secondary recovery"). Secondary production requires reservoir injection, such as water flooding techniques, to displace hydrocarbons from the reservoir and into the wellbore. One or more injection wells located adjacent to the production wellbore may be utilized in such injection techniques.

The third stage of production is termed "tertiary production" or "enhanced oil recovery" ("EOR") (which may be referred to as "tertiary recovery"). Although EOR techniques are often utilized after the secondary production stage, they may in be initiated at any time during the productive life of an oil reservoir (i.e., during either of the primary production, secondary production, or thereafter). EOR techniques may restore formation pressure and improve oil displacement or fluid flow in the reservoir toward the wellbore. EOR techniques may result in the production of about 10-60%, or more, of a reservoir's original hydrocarbons in place.

The three major types of EOR techniques are chemical flooding (alkaline flooding or micellar-polymer flooding), thermal recovery (steamflood or in situ combustion), and gas injection (also referred to as "miscible displacement," and may include miscible displacement (gas injection with carbon dioxide or hydrocarbon injection). Two types of miscible displacement techniques include the water alternating gas ("WAG") technique and the simultaneous water and gas injection ("SWAG") technique, in which both water and gas are injected into the formation either alternatingly or simultaneously (i.e., as a mixture) to displace hydrocarbons toward a production wellbore.

The optimal application of each type of EOR technique will be recognized by one of skill in the art and may depend on a number of factors including, but not limited to, temperature, pressure, depth, net pay, permeability, rock type, residual oil and/or water saturations, porosity, fluid properties such as API gravity and viscosity, and the like.

As used herein, the term "phase," refers to a substance having a chemical composition and physical state that is distinguishable from an adjacent phase of a substance having a different chemical composition or a different physical state. As used herein, if not otherwise specifically stated, the physical state or phase of a substance (or a mixture of substances) and other physical properties are determined at a temperature of 25° C. (77° F.) and a pressure of 1 atmosphere (Standard Laboratory Conditions) without applied shear.

As used herein, the term "particle" refers to a body having a finite mass and sufficient cohesion such that it can be considered as an entity, but having relatively small dimensions. A particle may be of any size ranging from molecular scale to macroscopic, depending on the context.

A particle may be in any physical state. For example, a particle of a substance in a solid state may be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters.

As used herein, the term "particulate" or "particulate material" refers to matter in the physical form of distinct particles in a solid or liquid state (which means such an association of a few atoms or molecules). As used herein, a particulate may be a grouping of particles having similar chemical composition and particle size ranges from a lower limit of about 0.05 µm (equivalent to 50 nm), for example microscopic particles, to an upper limit of about 3 mm, for example large grains of sand.

As used herein, a "dispersion" refers to a system in which particles of a substance of one chemical composition and physical state are dispersed in another substance of a different chemical composition or physical state. In some instances, the phases in a dispersion may be nested. If a substance has more than one phase, the most external phase is referred to as the "continuous phase" of the substance as a whole, regardless of the number of different "internal phases" or nested phases therein. A dispersion may be classified in several different ways including, but not limited to, based on the size of the dispersed particles, the uniformity or lack of uniformity of the dispersion, whether or not precipitation occurs if the dispersion is in fluid form, and the like.

A heterogeneous dispersion may be in the form of a "suspension," where the dispersed particles are larger than about 50 µm. Such particles may be viewed with a microscope, or if larger than about 50 µm, with the unaided eye. A heterogeneous dispersion may also be in the form of a "colloid," where the dispersed particles range up to about 50 µm in size.

As used herein, "fluid" or "fluids" refer to gas phase fluids and liquid phase fluids. Additionally, a fluid may be homogeneous or heterogeneous. In general, a fluid is an amorphous substance that is or has a continuous phase of particulates that are smaller than about 1 µm that tends to flow and conform to the outline of its container. A gas (in the sense of a physical state) phase fluid refers to an amorphous substance that has a high tendency to disperse (at the molecular level) and a relatively high compressibility. A liquid phase fluid refers to an amorphous substance that has little tendency to disperse (at the molecular level) and relatively high incompressibility. The tendency to disperse is related to intramolecular forces, known as van der Wall's forces.

A continuous mass of a particulate, for example, a powder or sand, may tend to flow as a fluid depending on many factors, including, but not limited to, the particle size distribution, the particle shape distribution, the proportion and nature of any wetting liquid or other surface coating on the particles, and the like. Nevertheless, as used herein, a fluid does not refer to a continuous mass of particulates as the sizes of the solid particles of a mass of a particulate are too large to be appreciable affected by the range of intramolecular forces.

Every fluid inherently has at least a continuous phase. A fluid can have more than one phase. For example, a fluid can be in the form of a suspension (larger solid particles dispersed in a liquid phase), an emulsion (liquid particles dispersed in another liquid phase), a foam (a gas phase dispersed in a liquid phase), or an aerosol (liquid or solid particles dispersed in a gas phase).

The term "wettability," as used herein, refers to the preference of a solid to contact one liquid or gas, known as the wetting phase, rather than another. Wettability involves the contact between a fluid and a solid surface, resulting from the intermolecular interactions when the two different phases are brought together. In general, the degree of wetting (or wettability) depends on the force balance between adhesive forces between the fluid and solid surface and cohesive forces of the fluid (i.e., surface tensions). Adhesive forces between a liquid and a solid may cause a liquid drop to spread across the surface. Cohesive forces within a liquid may cause the drop to ball up and avoid contact with the surface.

One measurement of the degree of wettability is the contact angle, the angle at which the fluid interface meets the solid interface. If the wettability is very favorable to the fluid, the contact angle will be low, and the fluid will spread to cover or "wet" a larger area of the solid surface. If the wettability is unfavorable, the contact angle will be high, and the fluid will form a compact, self-contained droplet on the solid surface. If the contact angle of a water droplet on a solid surface is low, the surface may be said to be "water-wet" (and inversely, probably not oil-wet). On the other hand, if the contact angle of an oil droplet on a solid surface is low, the surface may be said to be "oil-wet" (and inversely, probably not water-wet). As used herein, a wet or wetted surface or the wetting of a surface may refer to a different fluid phases that are directly in contact with and adhered to the surface of a solid body. For example, the fluid phase can be an oleaginous film on the surface of a metallic tubular or the face of a borehole in the material of a subterranean formation.

Some fluids can form a film or layer on a downhole surface, which can have undesirable effects. The fluid (or a liquid component of the fluid) can form a film or layer on the surface, which can act as a physical barrier between the material of the underlying solid body and a fluid adjacent to the surface of the solid body. In effect, such a film presents a different wettability characteristic than the material of the underlying solid body. For example, an oleaginous film on the surface of a metal tubular may block water from wetting the underlying surface, which would otherwise be water-wet.

Recovery of a fluid from a subterranean formation depends on several factors and, among them, capillary pressure is one particularly important factor. The capillary pressure, ΔP, is governed by a simple, albeit approximate, relation as shown in the following Equation 1:

$$\Delta P = \frac{2\sigma}{\gamma}\cos\theta \quad \text{Equation 1}$$

where σ represents the surface tension of a fluid, r the radius of a pore throat in a subterranean formation, and θ represents the contact angle of the fluid on a surface. For a certain formations, pore throat size r is constant, and therefore there are only two parameters, namely σ and θ, that may be adjusted to manipulate the capillary pressure.

Altering the wettability of a subterranean formation may help with the recovery of a fluid from the formation. As stated, wetting and wettability involve the contact between a fluid and a solid surface, resulting from the intermolecular interactions when the two are brought together. The amount of wetting depends on the energies (or surface tensions) of the interfaces involved such that the total energy is minimized. One measurement of the degree of wetting is the contact angle, the angle at which, for example, a liquid-vapor interface meets a solid-liquid interface. If the wetting is very favorable, the contact angle will be low, and the fluid will spread to cover or "wet" a larger area of the solid surface. If the wetting is unfavorable, the contact angle will be high, and the fluid will form a compact, self-contained droplet on the solid surface. If the contact angle of water on a surface is low, the surface may be said to be "water-wet," whereas if the contact angle of an oil droplet on a surface is low, the surface may be said to be "oil-wet."

As used herein, a water-wet surface has a contact angle for water between 0 to 90 degrees. A surface having a contact angle at or above ninety degrees for water is described as non-water wet. Similarly, an oil-wet surface has a contact angle for oil between 0 to 90 degrees. A surface having a contact angle at or above ninety degrees for oil is described as non-oil wet.

The wettability of a subterranean formation can be altered by changing the contact angle. By changing the contact angle, the capillary pressure to a water-based or oil-based fluid can be greatly changed. For example, when the contact angle θ becomes 90°, cos θ becomes zero, and so does the capillary pressure, or when the contact angle is larger than 90°, cos θ becomes negative, meaning the fluid is repelled by the pore throats in a subterranean formation.

Unless otherwise specified or unless the context otherwise clearly requires, any ratio or percentage means by weight.

Converted to SI units, 1 darcy is equivalent to $9.869233 \times 10^{-13}$ m$^2$ or 0.9869233 (μm)$^2$. This conversion is usually approximated as 1 (μm)$^2$.

Oil gravity represents the density of the oil at stock tank conditions. The oil gravity has a very strong effect on the calculated oil viscosity ($m_o$) and solution gas-oil ratio ($R_s$). It has an indirect effect on the oil compressibility ($c_o$) and the oil formation volume factor ($B_o$), since these variables are affected by the solution gas-oil ratio ($R_s$), which is a function of oil gravity. Usually, the oil gravity is readily known or determined. It may range from about 60° API to about 10° API. The conversion from API gravity (oil field units) to density (kg/m3 (SI units)) is: 141.5/[° API gravity+131.5]. Oil is classified as heavy oil if it has an API gravity of less than 22.3° API, medium oil if it has an API gravity from 22.3 to 31.1° API, and light oil if it has an API gravity greater than 31.1° API. If unknown, the default value used is for a medium oil of 30° API.

II. Introduction

The embodiments herein relate to the use of volatile surfactants to increase the recovery of gas or oil from subterranean formation, including during enhanced oil recovery operations. Specifically, the embodiments herein relate to enhanced oil recovery operations including traditional gas injection, WAG injection, and SWAG injection.

Surfactants may be included in the gas phase of an injected gas for an EOR operation. The surfactant may reduce the interfacial tension between oil and water, thus decreasing capillary pressure. The surfactant may also alter rock wettability, making the formation water-wet or mixed-wet. Such interfacial tension reduction and/or altering of rock wettability may increase the recovery of hydrocarbons from the formation. A volatile surfactant may particularly increase the recovery of hydrocarbons as the volatility of the surfactant enhances its dispersion in the gas phase. Moreover, because the volatile surfactant is dispersed in the gas phase, injectivity (or pumping) of the treatment fluid comprising the volatile surfactant for an EOR operation may be greatly reduced or eliminated due to the reduced viscosity of the treatment fluid as a result of the presence of the volatile surfactant. Additionally, formation damage concerns from introducing the treatment fluid for the EOR operation may be greatly reduced or eliminated. Without limitation, the embodiments of the present disclosure are capable of use as a secondary recovery method due to their pressure maintenance ability and/or as an EOR operation due to the presence of the volatile surfactant in the injection gas.

Many surfactants exist, but few have an appreciable vapor pressure or volatility. Many surfactants are ionic in nature; however, ionic surfactants are generally non-volatile, except for some ammonium salts or amine salts. Indeed, few surfactants exhibit significant volatility and can be easily vaporized or distilled, and as such, volatile surfactants are not typically used in subterranean operations, particularly in gas injection operations.

In general, the volatile surfactants for use in some embodiments of the present disclosure may have certain defining characteristics. In some embodiments, the volatile surfactant may have a normal boiling point of less than 260° C. (500° F.) without substantial thermal decomposition. As used herein, the term "substantial thermal decomposition" refers to thermal decomposition of greater than about 50% of the volatile surfactant at the boiling point after about 7 days in an oxygen-free system. In some embodiments, the volatile surfactant may provide a dynamic surface tension of less than about 40 dynes/cm for a 0.1 wt. % solution. Generally, in accordance with the embodiments described herein, the greater the volatility of the surfactant (having a low boiling point), the more effective a particular gas injection operation. The high volatility surfactant is able to enter into the gas phase and move with the gas in the subterranean formation. The potential materials and volatile surfactants disclosed in the present disclosure are not limited to currently commercially-available materials of the following examples, but other volatile materials may also be used or made.

Implementation of the disclosed embodiments may typically be in injection wells. Such embodiments may provide higher recoveries of oil from subterranean formations.

III. The Gas Phase

A gas is a substance of one or more chemicals, each having the physical property of being a gas phase at Standard Laboratory Conditions. In various embodiments of the present disclosure, gas may be injected into a subterranean formation (e.g., using an injection well) so as to displace hydrocarbons from the formation and drive them toward a production well for production to the surface. In some exemplary operations, WAG or SWAG operations are utilized in which water is alternated with the gas or water and gas are injected together, simultaneously. The water may increase the sweep efficiency of the gas and, thereby, increase the recovery of hydrocarbons from the formation.

As used herein, a treatment fluid (or "flooding composition") may comprise a gas and a volatile surfactant, which may be introduced into a subterranean formation alone or alternatively or simultaneously with water. Any suitable gas for use in a subterranean formation may be used according to one or more embodiments of the present disclosure. Examples of suitable gases include, but are not limited to, elemental gases, molecular gases, air, and any combination thereof. Suitable elemental gases may include, but are not limited to, hydrogen ($H_2$), nitrogen ($N_2$), oxygen ($O_2$), helium (He), neon (Ne), argon (Ar), krypton (Kr), xenon (Xe), ethane ($C_2H_6$), propane ($C_3H_8$), butane ($C_4H_{10}$), and any combination thereof. Suitable molecular gases may include, but are not limited to, carbon dioxide ($CO_2$), natural gas, methane ($CH_4$), and any combination thereof.

In some embodiments, the gas may be selected to be essentially free (that is, less than 0.001% by weight) of halogen atoms. Elements or chemicals of halogen atoms may be toxic. For example, although such gases may be otherwise functional for use in one or more embodiments of the present disclosure, it may be desirable to avoid substantial concentrations of gases such as fluorine ($F_2$), chlorine ($Cl_2$), and certain chlorocarbons, fluorocarbons, and chlorofluorocarbons.

In certain embodiments, the volatile surfactant disclosed herein is dispersed in the gas to form an aerosol or suspension in the gas. It may be preferably dispersed and distributed in the gas uniformly, regardless of the mixing technique used. In some embodiments, the volatile surfactant is dispersed in the gas phase of the treatment fluids described herein in an amount in the range of a lower limit of about 0.001 wt. %, 0.005 wt. %, 0.01 wt. %, 0.015 wt. %, 0.02 wt. %, 0.025 wt. %, 0.03 wt. %, 0.035 wt. %, 0.04 wt. %, 0.045 wt. %, 0.05 wt. %, 0.055 wt. %, 0.06 wt. %, 0.065 wt. %, 0.07 wt. %, 0.075 wt. %, 0.08 wt. %, 0.085 wt. %, 0.09 wt. %, 0.095 wt. %, 0.1 wt. %, 0.105 wt. %, 0.11 wt. %, 0.115 wt. %, 0.12 wt. %, and 0.125 wt. % to an upper limit of about 0.25 wt. %, 0.245 wt. %, 0.24 wt. %, 0.235 wt. %, 0.23 wt. %, 0.225 wt. %, 0.22 wt. %, 0.215 wt. %, 0.21 wt. %, 0.205 wt. %, 0.2 wt. %, 0.195 wt. %, 0.19 wt. %, 0.185 wt. %, 0.18 wt. %, 0.175 wt. %, 0.17 wt. %, 0.165 wt. %, 0.16 wt. %, 0.155 wt. %, 0.15 wt. %, 0.145 wt. %, 0.14 wt. %, 0.135 wt. %, 0.13 wt. %, and 0.125 wt. %.

IV. The Volatile Surfactants

Surfactants are compounds that lower the surface tension of a liquid, the interfacial tension between two liquids, or that between a liquid and a solid, or that between a liquid and a gas. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion. A surfactant can be or include a cationic, a zwitterionic, or a nonionic emulsifier. A surfactant package can include one or more different chemicals.

In a water phase, surfactants may form aggregates, such as micelles, where the hydrophobic tails form the core of the aggregate and the hydrophilic heads are in contact with the surrounding liquid. The aggregates may be formed in various shapes such as spherical or cylindrical micelles or bilayers. The shape of the aggregation depends upon various factors such as the chemical structure of the surfactant (e.g., the balance of the sizes of the hydrophobic tail and hydrophilic head), the concentration of the surfactant, nature of counter ions, ionic salt concentration, co-surfactants, solubilized components (if any), pH, temperature, pressure, and the like.

As used herein, the term "micelle" includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. Micelles can function, among other purposes, to stabilize emulsions, break emulsions, stabilize a foam, change the wettability of a surface, or solubilize certain materials.

In a mixture of two immiscible liquids containing interfacially active solutes, a freshly created interface will generally not be in compositional equilibrium with the two immiscible liquids it separates. It is only after solute redistribution from one or both phases (that is, adsorption) has occurred that this interface will achieve its equilibrium state. The interfacial tension of freshly created interfaces is known as "dynamic surface tension".

As used herein, a "low" dynamic surface tension (or interfacial tension) means less than about 20 dynes/cm for a 0.01 wt. % solution. Generally, the methods for determining surface tension include techniques known in the art, such as spinning drop, pedant drop, or bubble pressure. If there is any difference in the measurements obtained, the dynamic surface tension is measured with reference to a bubble pressure technique.

Volatility is the tendency of a substance to vaporize. Volatility is directly related to the vapor pressure of a substance. At any given temperature, for a particular chemical compound, there is a vapor pressure at which the gas of that compound is in dynamic equilibrium with its liquid or solid form. It is a measure of the tendency of molecules and atoms to escape from a liquid or a solid. The equilibrium vapor pressure is an indication of the evaporation rate. A substance with a relatively high vapor pressure at normal temperatures is often referred to as volatile. Normal temperature may be defined herein to refer to API temperature of 15.6° C. (or 60° F.).

The boiling point of a liquid corresponds to the temperature at which its vapor pressure is equal to the surrounding pressure. The boiling point at one atmosphere pressure is often called the "normal" boiling point of the substance. The higher the vapor pressure of a liquid at a given temperature, the higher the volatility and the lower the normal boiling point of the liquid. Evaporation rates generally have an inverse relationship to boiling points; that is, the higher the boiling point, the lower the rate of evaporation.

The volatile surfactants of the embodiments disclosed herein may have a normal boiling point in the range of a lower limit of about 130° C., 135° C., 140° C., 145° C., 150° C., 155° C., 160° C., 165° C., 170° C., 175° C., 180° C., 185° C., 190° C., and 195° C. to an upper limit of about 260° C., 255° C., 250° C., 245° C., 240° C., 235° C., 230° C., 225° C., 220° C., 215° C., 210° C., 205° C., 200° C., and 195° C. (or about 500° F. to about 446° F.), without substantial thermal decomposition. In some embodiments, the volatile surfactants for use in the embodiments herein may be liquid at Standard Laboratory Conditions.

Many volatile surfactants exist or may be made that have the desired characteristics, according to one or more embodiments of the present disclosure. Additionally, a number of volatile surfactants that may be used in the embodiments herein are currently commercially available.

Certain volatile surfactants for use in the embodiments described herein may include non-ionic surfactants.

In some embodiments, the volatile surfactant may be a non-ionic surfactant of the acetylenic alcohol types (e.g., having an acetylenic group and an alcohol group, or having an acetylenic group and a germinal alcohol group). Such acetylenic alcohol volatile surfactants may have the general Formula 1:

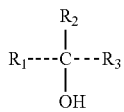

Formula 1 wherein, $R_1$ is an alkynyl of from 2 to 5 carbons, $R_2$ is hydrogen or an alkyl of less than 4 carbons, and $R_3$ is an alkyl or hydroxyl alkyl of from 1 to 8 carbons, the total number of carbons being 4 to 12 carbons.

Specific examples of acetylenic alcohols may include, but are not limited to, 3,5-dimethyl-1-hexyn-3-ol (available commercially as SURFYNOL™ from Air Products and Chemicals, Inc. in Allentown, Pa.), 3,6-dimethyl-4-octyne-3,6-diol (available commercially as SURFYNOL™ 82 from Air Products and Chemicals, Inc. in Allentown, Pa.), 2,4,7,9 tetramethyl-5-decyne 4,7 diol (available commercially as SURFYNOL™ 104 from Air Products and Chemicals, Inc. in Allentown, Pa.), and any combination thereof. Each of these acetylenic germinal alcohols meet the normal boiling point volatility parameters of the present disclosure for use in EOR operations according to one or more embodiments herein, as provided in Table 1, which also provides the chemical structures of the volatile surfactants.

TABLE 1

| Volatile Surfactant | Normal Boiling Point | Structure |
|---|---|---|
| 3,5 dimethyl-1-hexyn-3-ol | 160° C. (320° F.) | |
| 3,6-dimethyl-4-octyne-3,6-diol | 221° C. (430° F.) | |

TABLE 1-continued

| Volatile Surfactant | Normal Boiling Point | Structure |
|---|---|---|
| 2,4,7,9-tetramethyl-5-decyne-4,7-diol | 221° C. (430° F.) | |

Similarly, the acetylenic germinal alcohols meet the surface tension volatility parameters of the present disclosure for use in EOR operations according to one or more embodiments herein. For example, the reported dynamic and equilibrium surface tensions in dynes/cm at 0.1 wt. % concentration for 2,4,7,9-tetramethyl-5-decyne-4,7-diol, are provided in Table 2.

TABLE 2

| At relative rate of surface formation (bubbles/sec) | Surface Tension (dynes/cm) |
|---|---|
| 1 (at equilibrium) | 33.1 |
| 3 | 34.1 |
| 6 (dynamic) | 36.4 |

The properties of the volatile acetylenic germinal alcohol surfactants, among other benefits, are characterized as having reduced interfacial tension and should increase oil recovery during EOR operations.

The acetylenic germinal alcohol volatile surfactants are non-ionic and should not produce any or a significant amount of undesirable precipitates that may damage the permeability of a treated subterranean formation under downhole conditions. Additionally, such acetylenic germinal alcohol volatile surfactants are sufficiently volatile for use in one or more embodiments described herein and the vapor of such volatile surfactants may be carried deeper into subterranean formations as compared to use of the treatment fluids described herein without a surfactant or with a traditional surfactant, including into low permeable formations such as tight gas or shale formation. Moreover, the acetylenic germinal alcohol volatile surfactants are relatively environmentally friendly and have a low toxicological impact.

In addition to the acetylenic germinal alcohol volatile surfactants, polyether modified silicones may be used as a volatile surfactant, in accordance with one or more embodiments of the present disclosure. Examples of suitable polyether modified silicones are described in U.S. Pat. No. 7,547,797, which is incorporated herein by reference in its entirety. In general, suitable polyether modified silicones for use as volatile surfactants in the methods and compositions described herein may have the following chemical Formula 2:

wherein n is an integer from 0-2, two A groups are methyl groups, and the remaining A group is a substituent group expressed by the following chemical Formula 3:

wherein a is an integer from 3-4, b is an integer from 1-7, and R is a methyl group or an ethyl group.

Fluorocarbons may also be used as volatile surfactants for use in the treatment fluids described herein, according to one or more embodiments of the present disclosure. Examples of suitable fluorocarbon surfactants for use as volatile surfactants in the methods and compositions disclosed herein are described in Yuri Yu. Stoilov, Fluorocarbons as Volatile Surfactants, Langmuir 1998 14 (20), 5685-5690, the entirety of which is incorporated herein by reference. Examples of suitable fluorocarbons for use as volatile surfactants may include, but are not limited to perfluorooctanoic acid, ammonium perfluorooctanoic acid, and any combination thereof. For example, perfluorooctanoic acid has a normal boiling point of 189° C. (372° F.).

It should be noted that while a number of fluorocarbon surfactants are volatile, they have several significant problems including: (a) they are generally considered to be potent "greenhouse" gases and pollutants; and (b) they often have (e.g., perfluorooctanoic acid) other toxic/carcinogenic properties. For such reasons, while these chemical compounds could be useful according to the general methods of this disclosure, they are not preferred for this application.

V. The Treatment Fluids

According to one or more embodiments of the present invention, methods of treating a subterranean formation are provided, the methods including forming a treatment fluid according the present disclosure and introducing the treatment fluid into the wellbore. In general, the methods provided herein use treatment fluids for use in gas injection enhanced oil recovery operations including, but not limited to, WAG and SWAG operations.

A treatment fluid may be prepared at the well site (or job site), at a plant or facility prior to use, and/or certain components of the treatment fluid may be pre-mixed prior to use and then transported to the well site. In some embodiments, the preparation of a treatment fluid may be performed at a well site "on-the-fly." As used herein, the term "on-the-fly" refers to methods of combining two or more components wherein a flowing stream of one element is continuously introduced into a flowing stream of another element so that the streams are combined and mixed while continuing to flow as a single stream as part of an on-going treatment (i.e., performing an operation during a treatment that does not require stopping normal operations). Such mixing may be described as "real-time" mixing.

In some embodiments, the treatment fluids for use in the embodiments of the present disclosure may include a gas and a volatile surfactant. The volatile surfactant may be included (e.g., dispersed) in the gas phase of the treatment fluid in an amount in the range of a lower limit of about 0.001 wt. %, 0.005 wt. %, 0.01 wt. %, 0.015 wt. %, 0.02 wt. %, 0.025 wt. %, 0.03 wt. %, 0.035 wt. %, 0.04 wt. %, 0.045 wt. %, 0.05 wt. %, 0.055 wt. %, 0.06 wt. %, 0.065 wt. %, 0.07 wt. %, 0.075 wt. %, 0.08 wt. %, 0.085 wt. %, 0.09 wt. %, 0.095 wt. %, 0.1 wt. %, 0.105 wt. %, 0.11 wt. %, 0.115 wt. %, 0.12 wt. %, and 0.125 wt. % to an upper limit of about 0.25 wt. %, 0.245 wt. %, 0.24 wt. %, 0.235 wt. %, 0.23 wt. %, 0.225 wt. %, 0.22 wt. %, 0.215 wt. %, 0.21 wt. %, 0.205 wt. %, 0.2 wt. %, 0.195 wt. %, 0.19 wt. %, 0.185 wt. %, 0.18 wt. %, 0.175 wt. %, 0.17 wt. %, 0.165 wt. %, 0.16 wt. %, 0.155 wt. %, 0.15 wt. %, 0.145 wt. %, 0.14 wt. %, 0.135 wt. %, 0.13 wt. %, and 0.125 wt. %.

Treatment fluids comprising a gas and a volatile surfactant may be introduced into a subterranean formation alone or intermittently with water to perform a WAG operation. In other embodiments, the treatment fluids for use in the embodiments of the present disclosure may include a gas, a volatile surfactant, and water, which may be introduced into a subterranean formation to perform a SWAG operation. Generally, the presence of the volatile surfactant in the treatment fluid may permit a reduction in the gas necessary to perform the same sweep efficiency as a gas without the volatile surfactant. In some embodiments, the presence of the volatile surfactant may permit a reduction in gas in the treatment fluid by about 0.5% to about 20%, compared to the same treatment fluid without the volatile surfactant. This is due to the water/oil interfacial tension reduction by the surfactants mixed with the gas.

The water that may be used to perform the WAG or SWAG operations described according to one or more embodiments herein may include any aqueous fluid from any source suitable for use in a subterranean formation, provided that it does not adversely interfere with the components of the treatment fluids described herein (i.e., the gas or the volatile surfactants). Examples of aqueous fluids suitable for use in the treatment fluids of the embodiments of the present disclosure may comprise fresh water, saltwater (e.g., water containing one or more salts dissolved therein), brine (e.g., saturated salt water), seawater, formation water, produced water, or combinations thereof.

In some embodiments, in which a WAG operation is to be performed, the aqueous fluid may be intermittently injected into a subterranean formation with the treatment fluid (e.g., through an injection well). As used herein, the terms "intermittently" or "intermittently injected" with reference to the aqueous fluids and treatment fluids described herein refer to an alternative pumping operation in which an amount of treatment fluid is introduced into a formation and stopping the flow, followed by introducing the aqueous fluid into the formation and stopping the flow, followed by introducing another stream of treatment fluid and stopping the flow, and so on. Such intermittent or alternating pumping may be in any order, such that the aqueous fluid or the treatment fluid may be first introduced into the formation. In some embodiments, the volume of the treatment fluid (comprising the gas and volatile surfactant) and the volume of the aqueous fluid may be introduced into the subterranean formation at an alternating ratio of a lower limit of about 0.05:99.95 to an upper limit of about 50:50.

In those embodiments, in which a SWAG operation is to be performed, the aqueous fluid may be injected into a subterranean formation with the gas and the volatile surfactant (e.g., through an injection well). That is, the treatment fluid may comprise a gas, a volatile surfactant, and an aqueous fluid. In such embodiments, the aqueous fluid may be present in an amount of about 80 wt. % to about 99.95 wt. % of the treatment fluid composition as a whole.

In some embodiments, the treatment fluids of the present disclosure may further comprise an additive suitable for use in an EOR operation. Examples of suitable additives may include, but are not limited to, polymers, organic bases, inorganic bases, organic surfactants, inorganic surfactants, and any combination thereof.

As stated, the treatment fluids for use in some of the embodiments described herein may be pre-mixed, mixed prior to their arrival at the well site, at the well site, or during operations on-the-fly. Normal precautions should be taken to avoid any chemical spills of the treatment fluid during injection of the treatment fluid into the formation. In some embodiments, the step of injecting the treatment fluid into the subterranean formation may be performed within a relatively short period after forming the treatment fluid, for example, within less than about 24 hours or less than about 30 minutes. In preferred embodiments, the step of injecting the treatment fluid into the subterranean formation may be performed on-the-fly. It will be appreciated by one of skill in the art that one or more fluid pumps may be used to inject the treatment fluid into a subterranean formation and, in some embodiments, it may be advantageous to employ more than one pump. Generally, laminar flow of the treatment fluid is preferred, as such flow may reduce viscous fingering and improve oil recovery.

In some embodiments, the treatment fluid (and any intermittent aqueous fluid) may be preferably introduced into the subterranean formation at a rate and pressure below the fracture pressure of the treatment zone. As used herein, the term "fracture pressure" refers to the pressure above which injection of fluids will case the formation to fracture hydraulically. In some embodiments, the treatment fluid (and any intermittent aqueous fluid) may be introduced into the treatment zone after a hydraulic fracturing treatment has been performed and/or after secondary recovery operations have been performed.

In some embodiments, the treatment fluid (and any intermittent aqueous fluid) may be introduced into a subterranean formation through an injection well and, in some embodiments, may be recovered from a production well in fluid communication with the treatment zone. Any such recovery of the treatment fluid (and any intermittent aqueous fluid) or any component thereof from a production well may be re-introduced into the subterranean formation by any means (including through an injection well or through a production well) for any type subterranean operation, including additional enhanced oil recovery operations. Moreover, such recovery of the treatment fluid (and any intermittent aqueous fluid) or any component thereof may be introduced into a different subterranean formation by any means and for any type of subterranean formation operations. In some embodiments, the gas may be recovered and reused for operations outside of the oil and gas industry.

A treatment fluid according to one or more embodiments described herein may be injected through an injection well to drive hydrocarbons to a production well. Often, the production well will not produce hydrocarbons for a long period of time with the pressure support from the reservoir. A treatment fluid according to the embodiments herein may be injected after waterflood or directly after primary pressure depletion. In some embodiments, a 3-phase separator may be used to separate the treatment fluid (and any intermittent aqueous fluid) from produced hydrocarbons from a production well. As previously stated, the general objective of the EOR operations described in some embodiments herein is the production of hydrocarbons (e.g., crude oil and/or natural gas) from a particular zone of a subterranean formation.

The treatment zone in the subterranean formation being treated with the treatment fluids disclosed herein may be any type of formation rock comprising a hydrocarbon-bearing reservoir therein. In some embodiments, the formation may be at least a portion of a conventional reservoir, a tight gas formation, and/or a shale formation. In some embodiments, the treatment zone is any subterranean formation comprising light, medium, or heavy oil. In preferred embodiments, the treatment zone comprises heavy oil.

In some embodiments, a design temperature of a treatment zone for use according to one or more embodiments described herein may be less than about 260° C. (500° F.). In some embodiments, for example, the design temperature of the treatment zone may be in the range of from a lower limit of about 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., and 140° C. to an upper limit of about 260° C., 255° C., 250° C., 245° C., 240° C., 235° C., 230° C., 225° C., 220° C., 215° C., 210° C., 205° C., 200° C., 195° C., 190° C., 185° C., 180° C., 175° C., 170° C., 165° C., 160° C., 155° C., 150° C., 145° C., and 140° C. (e.g., about 77° F. to about 500° F.).

In various embodiments, systems configured for delivering the treatment fluids (i.e., the gas and volatile surfactant treatment fluids, including intermittent aqueous fluids, and the gas, volatile surfactant, and aqueous fluid treatment fluids) described herein to a downhole location are described. In various embodiments, the systems can comprise a pump fluidly coupled to a tubular, the tubular containing the treatment fluids described herein. It will be appreciated that while the system described below may be used for delivering the treatment fluids described herein, such systems may additionally be used to intermittently deliver the treatment fluids with aqueous fluids to a downhole location; although such may additionally be delivered by separate means. However, for the purposes of describing delivery of the treatment fluids and/or the aqueous fluids that may be intermittently introduced, they will be collectively referred to with respect to the systems for delivering such fluids as "treatment fluid."

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture pressure of the subterranean formation, but it may also be used in cases where fracturing is not desired. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may enter into subterranean formation 18 and travel toward a production well adjacent to the tubular 16, which may form a portion of an injection well, so as to drive hydrocarbons toward the production well. In some embodiments, the treatment fluids may be produced from the production well and may be recirculated to subterranean formation 18, another subterranean formation, or for use in any other application.

It is also to be recognized that the disclosed treatment fluids may also directly or indirectly affect the various downhole equipment and tools that may come into contact with the treatment fluids during operation, although it is not generally expected to do so except that carbon dioxide may result in some corrosion. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a treatment fluid comprising: a gas; and a volatile surfactant dispersed in the gas, wherein the volatile surfactant has a normal boiling point of less than 260° C. without substantial thermal decomposition and a dynamic surface tension of less than about 40 dynes/cm for a 0.1% solution; and intermittently introducing the treatment fluid and an aqueous fluid into a treatment zone in a subterranean formation.

B. A method comprising: providing a treatment fluid comprising: a mixture of an aqueous fluid and a gas having a volatile surfactant dispersed therein, wherein the volatile surfactant has a normal boiling point of less than 260° C. without substantial thermal decomposition and a dynamic surface tension of less than about 40 dynes/cm for a 0.1% solution; and introducing the treatment fluid into a treatment zone in a subterranean formation.

Each of embodiments A and B may have one or more of the following additional elements in any combination:

Element 1: Wherein the treatment fluid and the aqueous fluid are intermittently introduced into the treatment zone in the subterranean formation through an injection well, so as to displace hydrocarbons in the subterranean formation toward a production well.

Element 2: Wherein the treatment fluid and the aqueous fluid are introduced into the treatment zone in the subterranean formation through an injection well, so as to displace hydrocarbons in the subterranean formation toward a production well.

Element 3: Wherein at least one of the treatment fluid and the aqueous fluid are recovered from the production well.

Element 4: Wherein at least one component of the recovered treatment fluid and/or the aqueous fluid is re-introduced into at least one of the subterranean formation or a different subterranean formation.

Element 5: Wherein the aqueous fluid is selected from the group consisting of fresh water; saltwater; brine; seawater; formation water; produced water; or any combination thereof.

Element 6: Wherein treatment fluid and the aqueous fluid are intermittently introduced into the treatment zone in the subterranean formation at an alternating ratio of treatment fluid volume to aqueous fluid volume in the range of from about 0.05:99.95 to about 50:50.

Element 7: Wherein the aqueous fluid is present in an amount in the range of from about 80 wt. % to about 99.95 wt. % of the treatment fluid.

Element 8: Wherein the gas is selected from the group consisting of an elemental gas; a molecular gas; air; and any combination thereof.

Element 9: Wherein the volatile surfactant decreases capillary pressure in the subterranean formation.

Element 10: Wherein the volatile surfactant alters wettability of the subterranean formation to at least one of water-wet and mixed-wet.

Element 11: Wherein the volatile surfactant is dispersed in the gas in an amount in the range of from about 0.001 wt. % to about 0.25 wt. %.

Element 12: Wherein the volatile surfactant is dispersed in the gas to form an aerosol or a suspension in the gas.

Element 13: Wherein the volatile surfactant is a non-ionic surfactant.

Element 14: Wherein the volatile surfactant is an acetylenic alcohol surfactant having the formula:

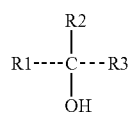

wherein R1 is an alkynyl of from 2 to 5 carbons, R2 is a hydrogen or an alkyl of less than 4 carbons, and R3 is an alkyl or a hydroxyl alkyl of from 1 to 8 carbons, the total number of carbons being 4 to 12 carbons.

Element 15: Wherein the volatile surfactant is selected from the group consisting of a 3,5-dimethyl-1-hexyn-3-ol; a 3,6-dimethyl-4-octyne-3,6-diol; a 2,4,7,9-tetramethyl-5-decyne-4,7-diol; and any combination thereof.

Element 16: Wherein the volatile surfactant is a polyether modified silicone having the formula:

wherein n is an integer from 0-2, two A groups are methyl groups, and remaining A group is a substituent group having the formula:

wherein a is an integer from 3-4, b is an integer from 1-7, and R is a methyl group or an ethyl group.

Element 17: Wherein the volatile surfactant is a fluorocarbon.

Element 18: Wherein the volatile surfactant is a fluorocarbon selected from the group consisting of a perfluorooctanoic acid; an ammonium perfluorooctanoic acid, and any combination thereof.

Element 19: Wherein the subterranean formation is a conventional reservoir, a tight gas formation, or a shale formation.

Element 20: Wherein the treatment zone in the subterranean formation comprises heavy oil.

Element 21: Wherein the design temperature of the treatment zone in the subterranean formation is less than 260° C.

Element 22: Wherein at least one of the treatment fluid and the aqueous fluid is introduced into the treatment zone in the subterranean formation using a pump.

Element 23: Wherein the treatment fluid is introduced into the treatment zone in the subterranean formation using a pump.

By way of non-limiting example, combinations applicable to A and B may include: A with 1, 5, and 19; A with 6, 10, and 22; A with 15, 16, 20, and 21; B with 2, 7, and 8; B with 17 and 19; B with 3, 9, 11, and 23.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising:
      a gas; and
      a volatile surfactant dispersed in the gas, wherein the volatile surfactant has a normal boiling point of less than 260° C. without substantial thermal decomposition and a dynamic surface tension of less than about 40 dynes/cm for a 0.1% solution; and
   intermittently introducing the treatment fluid and an aqueous fluid into a treatment zone in a subterranean formation, wherein the treatment fluid and the aqueous fluid are intermittently introduced into the treatment zone in the subterranean formation through an injection well, so as to displace hydrocarbons in the subterranean formation toward a production well.

2. The method of claim 1, wherein at least one of the treatment fluid and the aqueous fluid are recovered from the production well.

3. The method of claim 2, wherein at least one component of the recovered treatment fluid and/or the aqueous fluid is re-introduced into at least one of the subterranean formation or a different subterranean formation.

4. The method of claim 1, wherein the aqueous fluid is selected from the group consisting of fresh water; saltwater; brine; seawater; formation water; produced water; or any combination thereof.

5. The method of claim 1, wherein the treatment fluid and the aqueous fluid are intermittently introduced into the treatment zone in the subterranean formation at an alternating ratio of treatment fluid volume to aqueous fluid volume in the range of from about 0.05:99.95 to about 50:50.

6. The method of claim 1, wherein the gas is selected from the group consisting of an elemental gas; a molecular gas; air; and any combination thereof.

7. The method of claim 1, wherein the volatile surfactant decreases capillary pressure in the subterranean formation.

8. The method of claim 1, wherein the volatile surfactant alters wettability of the subterranean formation to at least one of water-wet and mixed-wet.

9. The method of claim 1, wherein the volatile surfactant is dispersed in the gas in an amount in the range of from about 0.001 wt. % to about 0.25 wt. %.

10. The method of claim 1, wherein the volatile surfactant is dispersed in the gas to form an aerosol or a suspension in the gas.

11. The method of claim 1, wherein the volatile surfactant is a non-ionic surfactant.

12. The method of claim 1, wherein the volatile surfactant is an acetylenic alcohol surfactant having the formula:

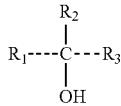

wherein $R_1$ is an alkynyl of from 2 to 5 carbons, $R_2$ is a hydrogen or an alkyl of less than 4 carbons, and $R_3$ is an alkyl or a hydroxyl alkyl of from 1 to 8 carbons, the total number of carbons being 4 to 12 carbons.

13. The method of claim 1, wherein the volatile surfactant is selected from the group consisting of a 3,5-dimethyl-1-hexyn-3-ol; a 3,6-dimethyl-4-octyne-3,6-diol; a 2,4,7,9-tetramethyl-5-decyne-4,7-diol; and any combination thereof.

14. The method of claim 1, wherein the volatile surfactant is a polyether modified silicone having the formula:

AMe$_2$SiO(MeASiO)$_n$SiMe$_2$A wherein n is an integer from 0-2, two A groups are methyl groups, and remaining A group is a substituent group having the formula:

—C$_a$H$_{2a}$O(C$_2$H$_4$O)$_b$R)

wherein a is an integer from 3-4, b is an integer from 1-7, and R is a methyl group or an ethyl group.

15. The method of claim 1, wherein the volatile surfactant is a fluorocarbon.

16. The method of claim 15, wherein the fluorocarbon is selected from the group consisting of a perfluorooctanoic acid; an ammonium perfluorooctanoic acid, and any combination thereof.

17. The method of claim 1, wherein the subterranean formation is a conventional reservoir, a tight gas formation, or a shale formation.

18. The method of claim 1, wherein the treatment zone in the subterranean formation comprises heavy oil.

19. The method of claim 1, wherein the design temperature of the treatment zone in the subterranean formation is less than 260° C.

20. The method of claim 1, wherein at least one of the treatment fluid and the aqueous fluid is introduced into the treatment zone in the subterranean formation using a pump.

21. A method comprising:
providing a treatment fluid comprising:
a mixture of an aqueous fluid and a gas having a volatile surfactant dispersed therein, wherein the volatile surfactant has a normal boiling point of less than 260° C. without substantial thermal decomposition and a dynamic surface tension of less than about 40 dynes/cm for a 0.1% solution; and
introducing the treatment fluid into a treatment zone in a subterranean formation.

22. The method of claim 21, wherein the treatment fluid and the aqueous fluid are introduced into the treatment zone in the subterranean formation through an injection well, so as to displace hydrocarbons in the subterranean formation toward a production well.

23. The method of claim 22, wherein at least one of the treatment fluid and the aqueous fluid are recovered from the production well.

24. The method of claim 23, wherein at least one component of the recovered treatment fluid and/or the aqueous fluid is re-introduced into at least one of the subterranean formation or a different subterranean formation.

25. The method of claim 21, wherein the aqueous fluid is selected from the group consisting of fresh water; saltwater; brine; seawater; or any combination thereof.

26. The method of claim 21, wherein the aqueous fluid is present in an amount in the range of from about 80 wt. % to about 99.95 wt. % of the treatment fluid.

27. The method of claim 21, wherein the gas is selected from the group consisting of an elemental gas; a molecular gas; air; and any combination thereof.

28. The method of claim 21, wherein the volatile surfactant decreases capillary pressure in the subterranean formation.

29. The method of claim 21, wherein the volatile surfactant alters wettability of the subterranean formation to at least one of water-wet and mixed-wet.

30. The method of claim 21, wherein the volatile surfactant is dispersed in the gas in an amount in the range of from about 0.001 wt. % to about 0.25 wt. %.

31. The method of claim 21, wherein the volatile surfactant is dispersed in the gas to form an aerosol or a suspension in the gas.

32. The method of claim 21, wherein the volatile surfactant is a non-ionic surfactant.

33. The method of claim 21, wherein the volatile surfactant is an acetylenic alcohol surfactant having the formula:

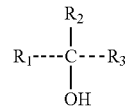

wherein R$_1$ is an alkynyl of from 2 to 5 carbons, R$_2$ is a hydrogen or an alkyl of less than 4 carbons, and R$_3$ is an alkyl or a hydroxyl alkyl of from 1 to 8 carbons, the total number of carbons being 4 to 12 carbons.

34. The method of claim 21, wherein the volatile surfactant is selected from the group consisting of a 3,5-dimethyl-1-hexyn-3-ol; a 3,6-dimethyl-4-octyne-3,6-diol; a 2,4,7,9-tetramethyl-5-decyne-4,7-diol; and any combination thereof.

35. The method of claim 21, wherein the volatile surfactant is a polyether modified silicone having the formula:

AMe$_2$SiO(MeASiO)$_n$SiMe$_2$A wherein n is an integer from 0-2, two A groups are methyl groups, and remaining A group is a substituent group having the formula:

—C$_a$H$_{2a}$O(C$_2$H$_4$O)$_b$R)

wherein a is an integer from 3-4, b is an integer from 1-7, and R is a methyl group or an ethyl group.

36. The method of claim 21, wherein the volatile surfactant is a fluorocarbon.

37. The method of claim 36, wherein the fluorocarbon is selected from the group consisting of a perfluorooctanoic acid; an ammonium perfluorooctanoic acid, and any combination thereof.

38. The method of claim 21, wherein the subterranean formation is a conventional reservoir, a tight gas formation, or a shale formation.

39. The method of claim 21, wherein the treatment zone in the subterranean formation comprises heavy oil.

40. The method of claim 21, wherein the design temperature of the treatment zone in the subterranean formation is less than 260° C.

41. The method of claim 21, wherein the treatment fluid is introduced into the treatment zone in the subterranean formation using a pump.

* * * * *